US007110027B2

(12) United States Patent
Wyman

(10) Patent No.: US 7,110,027 B2
(45) Date of Patent: Sep. 19, 2006

(54) METHOD AND APPARATUS FOR PRODUCING STILL VIDEO IMAGES USING ELECTRONIC MOTION VIDEO APPARATUS

(75) Inventor: Blair Wyman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 907 days.

(21) Appl. No.: 10/021,819

(22) Filed: Dec. 13, 2001

(65) Prior Publication Data

US 2003/0112347 A1 Jun. 19, 2003

(51) Int. Cl.
*H04N 5/76* (2006.01)

(52) U.S. Cl. ............................. 348/231.9; 348/231.99; 348/231.1; 348/231.3; 348/231.8; 348/220.1

(58) Field of Classification Search ............. 348/231.2, 348/231.3, 231.8, 220.1, 231.9, 231.99; 358/518
See application file for complete search history.

(56) References Cited

U.S. PATENT DOCUMENTS

| | | | | |
|---|---|---|---|---|
| 5,367,332 A | * | 11/1994 | Kerns et al. | 348/61 |
| 5,608,862 A | * | 3/1997 | Enokida | 345/501 |
| 6,424,795 B1 | * | 7/2002 | Takahashi et al. | 386/120 |
| 6,549,307 B1 | * | 4/2003 | Makishima et al. | 348/333.11 |
| 6,665,453 B1 | * | 12/2003 | Scheurich | 382/298 |
| 6,680,748 B1 | * | 1/2004 | Monti | 348/220.1 |
| 6,812,962 B1 | * | 11/2004 | Fredlund et al. | 348/231.2 |
| 6,891,566 B1 | * | 5/2005 | Marchese | 348/211.3 |
| 6,904,178 B1 | * | 6/2005 | Boliek et al. | 382/251 |
| 2002/0024602 A1 | * | 2/2002 | Juen | 348/220 |
| 2003/0031469 A1 | * | 2/2003 | Hirai | 386/120 |
| 2003/0090572 A1 | * | 5/2003 | Belz et al. | 348/207.1 |

* cited by examiner

*Primary Examiner*—Tuan Ho
*Assistant Examiner*—Chriss S. Yoder
(74) *Attorney, Agent, or Firm*—Roy W. Truelson

(57) ABSTRACT

An electronic video camera temporarily records and saves motion video in a relatively high-resolution form in a frame aging buffer. While video frames are saved in high-resolution form, it is possible to extract a relatively high-resolution still image from the buffer. The camera holds the video data in high-resolution form a limited time, eventually "aging" it as more frames are captured. The motion video is stored in persistent storage in a lower resolution form. At the user's option, relatively higher resolution frames from the buffer can also be saved.

33 Claims, 7 Drawing Sheets

METHOD AND APPARATUS FOR PRODUCING STILL VIDEO IMAGES USING ELECTRONIC MOTION VIDEO APPARATUS

FIELD OF THE INVENTION

The present invention relates to digital data devices, and in particular to digital cameras, motion video, and similar devices which electronically capture optical images.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

The declining prices and expanding capabilities of modem digital technology has caused it to be used in an ever increasing variety of applications. One of these applications has been the capturing of optical images electronically. Optical imaging technology generally uses a digital sensor array, such as a charge-coupled device (CCD) array, having a large number of photo-sensitive elements arranged in a regular pattern, and appropriate supporting hardware which scans the output of the elements and constructs therefrom a digital image. The digital image can then be stored in any digital data storage medium, displayed on a digital display device, printed on paper or other medium, manipulated using editing tools, or transmitted to remote locations using any transmission medium appropriate for digital data.

Optical imaging has been used in a variety of settings, including fax machines, document scanners, bar code readers, and so forth. In particular, electronic optical imaging is also used as a substitute for older film-based media in high-resolution still and motion picture cameras. Indeed, as electronic optical technology improves in quality and declines in price, many foresee the day when it will completely supplant the older film-based media in these fields.

A typical electronic camera, whether used for still or motion video, has an on-board digital data processor and is in effect a small, special purpose computer. These cameras are therefore often referred to as "digital" camera, and will be so referred to herein, although in fact data may sometimes be sensed, stored, or temporarily held or transmitted in an analog electronic mode. The optical sensor array used for capturing images can be used for either still or motion video images, provided that appropriate supporting hardware, programming and recording media is available. This fact has been used to advantage in various commercially available video cameras, which also have the optional capability to capture still images. Since a still image is normally saved in a different format than a motion video image, these cameras typically offer the user the option of a motion video or a still video mode. The common optical sensor array is used to capture the image in either case, but the captured image may be saved differently, depending on the operational mode.

Most digital cameras to date make limited use of digital technologies beyond straightforward optical scanning and recording. Such an approach fails to recognize the vast potential of the information age to provide improved integration of digital technology and enhanced function of digital cameras not yet conceived, a potential which is bounded only by human imagination. In particular, it fails to recognize the potential to obtain relatively high-resolution still images while recording in a relatively low-resolution motion video mode.

SUMMARY OF THE INVENTION

An electronic video camera apparatus temporarily records and saves motion video in a relatively high-resolution form in a frame aging buffer. While the video frames are saved in high-resolution form, it is possible to extract a relatively high-resolution still image from the buffer. The camera holds the video frames in high-resolution form a limited time, eventually "aging" them out of the buffer or to a lower resolution form as more motion video is captured.

In the preferred embodiment, the camera apparatus may have several modes of operation, including a motion video mode having standby high-resolution still video capability. The motion video is continuously saved on a motion video medium (such as magnetic tape) in a relatively low-resolution format typical of motion video. The frame aging buffer contains a series of recently captured frames in high-resolution form, and is therefore constantly being overwritten as new frames are captured. For example, the buffer may contain all frames in the last 10 seconds in high-resolution form. If, while recording the motion video, an event occurs which the user would like to capture as a high-resolution, still digital photograph, the user activates a saving function before the buffer has been overwritten, e.g., before the 10 second time period has elapsed. The saving function then preserves some or all of the buffer contents in high resolution form. Frames may be preserved, e.g., by disabling further writing to the buffer, or by writing the buffer contents to some other media, such as a flash memory stick. The user may continue to record motion video, and may later review the saved buffer contents and select one or more frames from the saved buffer for preservation as a still digital photograph.

A method and apparatus described herein provides an enhanced capability to capture still images in high-resolution format. Specifically, it allows a user to determine, after the occurrence of an event, that the event is such as should be preserved as a still image. This capability is generally useful for recording events of a momentary and unpredictable nature, when it is not known until after the event that a high-resolution still photograph will be desirable. Examples of such events include critical plays occurring in sports competitions, "cute" happenings in children at play, crimes or surveillance events as part of law enforcement, natural disasters, weather phenomena, and many others.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
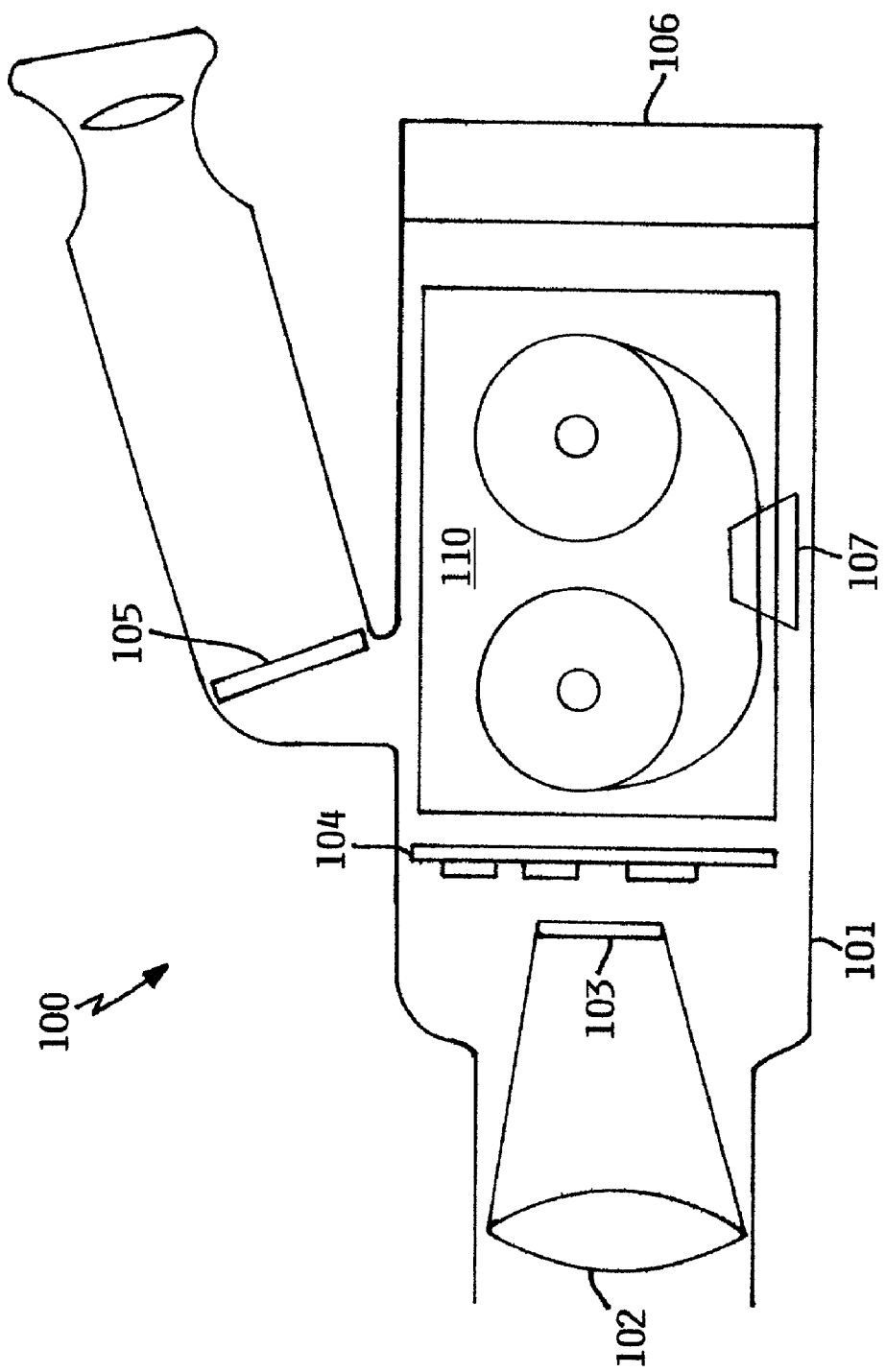
FIG. 1 is a high-level sectional view representing the major components of an electronic camera according to the preferred embodiment of the present invention.

FIG. 1 is a high-level sectional view of a digital electronic video camera (commonly known as a "camcorder" or video camera-recorder), according to the preferred embodiment. Camera 100 includes a body or housing 101, lens 102, and optical sensor 103. Preferably, sensor 103 is any of various conventional charge coupled device (CCD) arrays, it being understood that sensor 103 could alternatively be any optoelectronic technology, now existing or hereafter developed, which senses light of an optical image in a 2-dimensional area and converts the sensed image to an electrical signal. An electronic controller card 104 contains a programmable processor and other electronic components which control the operation of camera 100. Video images captured by sensor array 103 are displayed to a user on display 105, which is preferably a liquid crystal diode (LCD) display viewable through viewfinder lens. Video images are also recorded on recording media 110 using recording media interface 107. Generally, the recording media is removable media, such as a magnetic tape cassette (shown), a magnetic disk cassette, optical disk, etc., but the recording media could alternatively be permanently installed media, from which recorded data is periodically transferred to some other external storage media. In the case of a magnetic tape cassette, the recording media interface 107 includes read/write recording heads, drive motor, sprockets, capstans, and associated hardware needed for recording video images on the recording media; however, the nature of the recording media interface components will vary with the type of recording media. Battery 106 provides power to the various electronic components of camera 100.

It will be understood that the representation in FIG. 1 is intended as a high-level representation for illustrative purposes, and is not intended as a detailed drawing of all the components of a video camera. Camera 100 may have many additional components and features not shown, and which are not necessary to an understanding of the present invention. Additionally, the components which are shown are represented in simplified form for ease of understanding. E.g., lens 102 may be implemented as a multi-piece element having movable parts for adjusting the focal length. Furthermore, many variations exist in the design and placement of the various components. For example, sensor 103 may be implemented as a beam splitter which splits light into red, green and blue colors, and three separate CCD array devices, one corresponding to each color.

Figure 2:
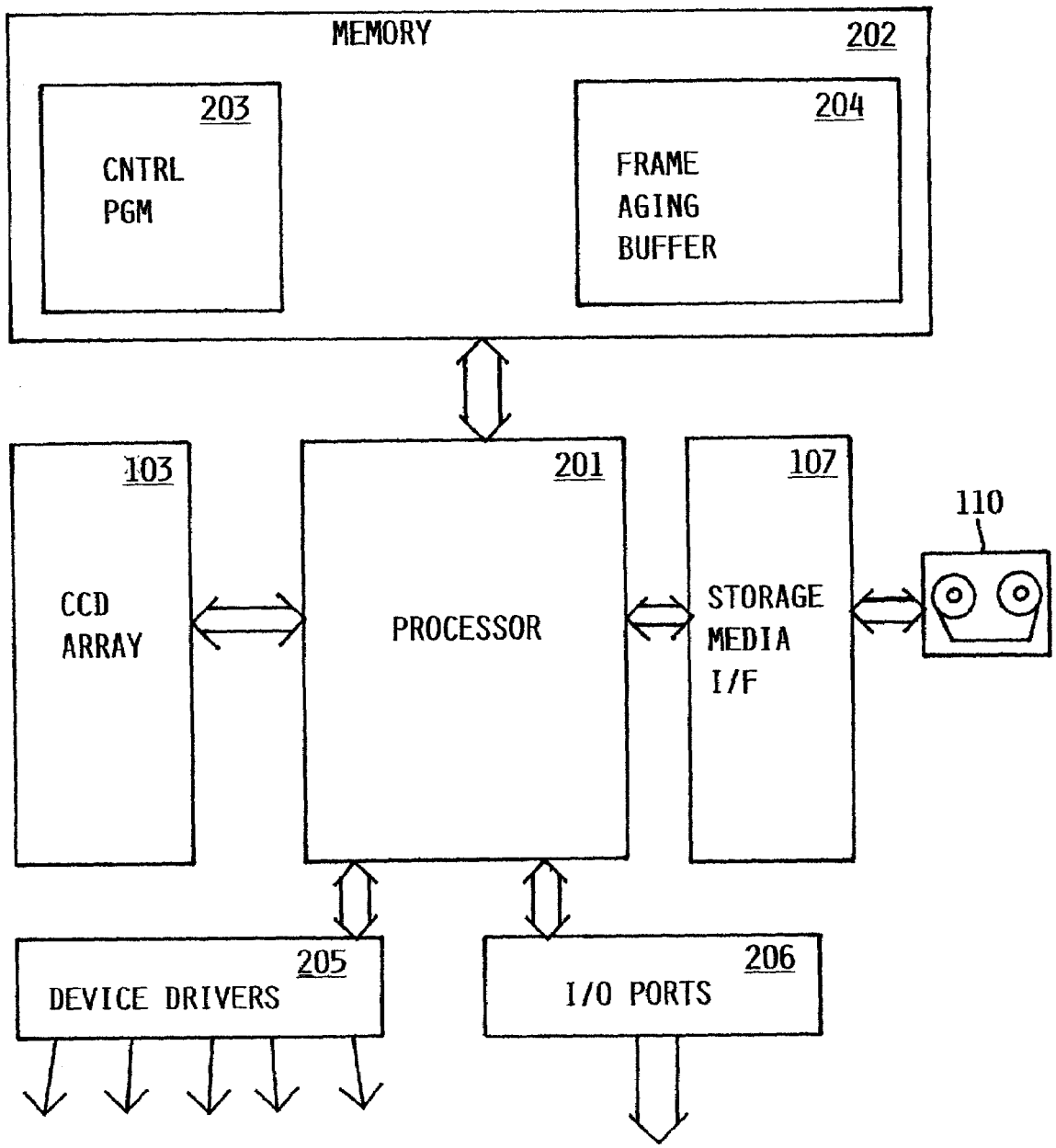
FIG. 2 is a illustrates the major electronic components of a camera, according to the preferred embodiment.

FIG. 2 is a high-level diagram illustrating the major electronic components of video camera 100, according to the preferred embodiment. The camera includes a programmable processor 201 in communication with a random access memory 202. Memory 202 contains a control program 203 comprising a plurality of processor executable instructions which, when executed on processor 201, control the operation of the camera. Memory further contains a frame aging buffer 204, as explained further herein. Processor 201 further communicates with optical sensor 103 in the form of a CCD array for capturing digital images; storage media interface 107 for storing digital images captured by the sensor 103 on storage media 110; device driver 205 for controlling various camera components; and I/O port controller 206.

Device driver 205 communicates with various conventional auxiliary camera components, some or all of which may be present in camera 100. These components include those controlled by processor 201, such as displays, lens, etc, as well as those from which processor 201 receives input, such as user accessible buttons and switches. Among these components is display 105. There may be additional displays (not shown), such as a second, larger LCD display which does not require a viewfinder. Preferably, there is also a small status display (not shown), such as an LCD display, for displaying numbers, text and icons to inform the use of camera status. Additionally, camera 100 preferably includes automatic focusing apparatus (not shown), which may take any of various conventional forms, such as an infrared rangefinder and lens focusing motor responsive to a determined range. Additional components may include user function switches and buttons; indicator lights, speakers, etc.; zoom motor (not shown), storage media eject apparatus, and so forth.

I/O port controller 206 drives one or more external I/O data ports for communicating with external devices, such as television receivers, VCRs, digital computers, and so forth. Preferably, there is also a small status display (not shown), such as an LCD display, for displaying numbers, text and icons to inform the user of camera status.

Although several auxiliary components are enumerated herein by way of example, it will be understood that these are listed by way of example only, and that a camera apparatus consistent with the present invention may include some or all of these components, and may include additional components not mentioned herein.

Memory 202 is shown as an integrated entity, but in fact it preferably includes multiple portions, which may be implemented on different electronic modules, using different circuit technologies, and accessed using different buses or paths. Specifically, memory 202 preferably includes a portion which is strictly non-volatile, i.e., the data in the non-volatile portion is not lost in the event the memory receives no power, whether due to battery failure, replacement, or other event. Control program 203 is preferably stored in this portion of memory. Memory 202 also preferably includes a volatile portion for storing temporary values, counters, etc., and particularly, for buffering video frames. The portion of memory 202 used for buffering video frames as described herein is shown as frame aging buffer 204. Buffer 204 may be a fixed-sized, permanently dedicated portion of memory 202, or it may be variable-sized portion of larger memory 202 which is allocated to the buffering function described herein when the camera is operated in a specific mode or modes.

Conventional electronic camera technology is capable of recording images at various degrees of resolution. The resolution chosen for a particular device, or for any particular operating mode of a device, will depend on various factors. A higher resolution requires more expensive sensor electronics and uses more data storage, but also produces a higher quality image output. Since higher quality output is not free, it should be applied only where the circumstances of use justify it.

It is well known that a higher resolution image is generally more desirable in still images than in motion video images. A still image invites the eye to focus on minute detail, and therefore coarseness or graininess of image is generally more noticeable than for a comparable motion video image. Additionally, the sheer number of frames required for motion video (e.g., approximately 15 per second) puts a higher demand on storage capacity, and makes it all the more necessary to economize on its use. Finally, still photos are often cropped and/or enlarged, so that coarseness in the original may become magnified in some uses.

As a result, conventional still video cameras typically have a higher resolution than comparable motion video cameras. For example, a typical motion video camera may contain a CCD array of 500,000 (500 K) pixels or less, part of which may be cropped from the stored image in order to compensate for jitter, so that the stored image may be 300 K pixels or less. A good quality still video camera will typically have a resolution of at least one million (1 M), and preferably several million, pixels. These numbers are given by was of example only, and it will be understood that as technology evolves and prices of electronic components decline, typical devices may be capable of finer resolutions.

Often, both types of camera can be operated in either mode, but the camera is clearly optimized for one predominant mode to the detriment of the other. For example, many conventional still video cameras can be operated in a motion video mode, but the resolution of the camera is so high and the storage capacity so limited that it is usually possible to operate in a motion video mode for only a short period of time (e.g., 20 seconds) before exhausting the storage capacity. On the other hand, many conventional motion video cameras can be operated in a still mode, or a still frame can be extracted from a recorded motion video stream, but the camera resolution is the same as for motion video, and produces a poor quality still image.

In the preferred embodiment, the camera has multiple modes of operation, one of which is a motion video mode, during which still images are buffered. When operating in this mode, the camera records motion video on an appropriate motion video recording medium, at a resolution appropriate for motion video, i.e., a relatively low resolution. Concurrently, video frames captured by sensor 103 are temporarily held frame buffer 204 at a higher resolution than the recording resolution for motion video, which resolution is appropriate for still images. Buffer 204 holds only a limited number of images, and as more images are captured by the sensor, previously captured images in buffer 204 are aged, and eventually overwritten. In the time interval before a frame in buffer 204 is overwritten by a more recent frame, the user may take some action to save the frame as a still image. The saved still image thus has a higher resolution than the recorded motion video, and it is therefore possible to have both the capability for high quality still images and reasonable storage capacity for motion video.

In order to support high resolution still images, optical sensor 103 must have a higher resolution than normally found in typical motion video cameras, even though the full extent of this resolution is not necessarily used in recording motion video. Preferably, the optical sensor can capture a frame having at least 1 M pixels, and in the exemplary embodiment described herein, a frame resolution of approximately 3 M pixels is assumed. The optical sensor itself is larger than the size of the frame to support image stabilization when operating a hand-held motion video camera. Specifically, if the frame resolution is 3 M pixels, a CCD optical sensor array of approximately 4–5 M pixels may be used.

When recording motion video, frames are concurrently recorded in the buffer 204 and on the motion video recording media 110 (which is preferably magnetic tape) at two different resolutions. The full frame captured by the CCD array (somewhat more than 3 M pixels) is jitter-compensated by cropping the borders, and is reduced to a viewable frame size having approximately 3 M pixels. This is not a change in resolution, but a reduction in area of the frame. The viewable, 3 M pixel frame thus produced is stored in buffer 204.

At approximately the same time, the full-resolution 3 M pixel viewable frame is converted to a low-resolution motion video frame of the same size. This could be accomplished according to any number of algorithms which average multiple pixels to reduce the resolution. E.g., a simple algorithm is to divide the full-resolution pixel array into 3×3 arrays of pixels, considering each such array to be a single pixel of the resultant low-resolution frame, and to average the red, green and blue values of the pixels in each 3×3 array to produce a single pixel value for each color. Thus a pixel count reduction by a factor of 9 (i.e., approximately 3M to approximately 300 K) can be produced. However, any of various alternative reduction algorithms, now known or hereafter developed, could alternatively be used.

Figure 3:
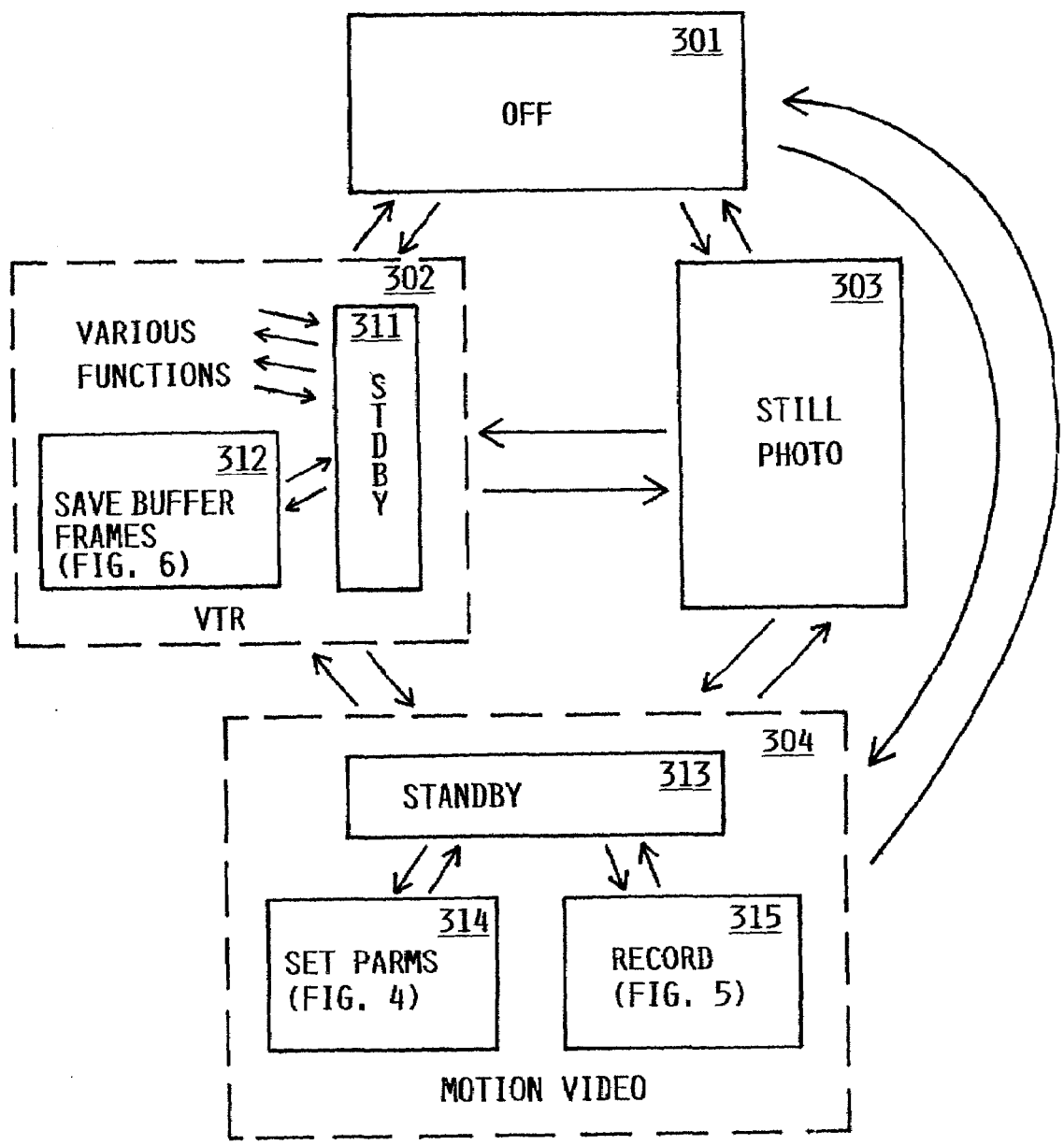
FIG. 3 is a state diagram illustrating at a high level certain of the operational states of a camera, according to the preferred embodiment.

FIG. 3 is a state diagram illustrating at a high level certain of the operational states of camera 100, according to the preferred embodiment. The camera has four major operational states, being off state 301, VTR state 302, still photo state 303, and motion video state 304. Preferably, one of the four major states is selected by the user positioning a state switch mounted on camera housing 101. By appropriately positioning the state switch, it is possible to change from any of the four states to any other of the four states, as indicated by the state transition arrows.

Off state 301 means that the camera is idle and no camera functions may be performed. Still photo state 303 is used to operate camera 100 as a still digital camera; it may contain functions for setting the parameters of the still photograph, a shutter function for capturing the still image, a timer function for timing the operation of the shutter, and so forth, as are known in the art of digital still photography. Images captured in the still photo state may be stored in any appropriate media. Appropriate media could include, e.g., motion video media 110, buffer 204, or separate media for storing still photographs such as a flash semiconductor memory module (not shown). Specifically, in a preferred embodiment herein, buffer 204 may have variable sized partitions for still photos taken in the still photo mode, and for buffering frames while in the motion video mode. In this case, the control program will correspondingly adjust the amount of space available in buffer 204 for temporary storage of frames while operating in the motion video mode. When the user captures new still photos, the buffer capacity for motion video mode is reduced, and when the user releases still photo buffer space (e.g., after uploading the contents to a computer), the buffer capacity for motion video mode is increased.

VTR state 302 is used for a variety of viewing, data transfer and editing functions. Upon entering the VTR state, the camera is in a VTR standby mode 311, from which it may receive further instructions from the user to perform any of the various functions. E.g., VTR state preferably has tape functions such as rewind, fast forward, play, pause, etc. Additionally, VTR state may have functions for editing or erasing stored images, for transferring images between the camera and another device, such as a computer, for setting various camera parameters, and so forth. These various functions are known in the art, and are not shown in FIG. 3 for clarity of illustration. Among the functions available in the VTR state is a save buffer frames function 312, which is explained in further detail herein.

Motion video state 304 is used for recording motion video on media 110 and simultaneously buffering still frames in buffer 204. Upon entering the motion video state, the camera is in motion video standby mode 313. While in standby mode, optical sensor 103 is activated, and images captured by sensor 103 are displayed on display screen 105. However, while in standby mode, images are not recorded on recording media 110. The user may elect to set certain recording parameters from standby mode, shown in FIG. 3 as set parameters mode 314, and described below in greater detail with respect to FIG. 4. If not set by the user, default parameters are assumed. Parameter values set by the user are saved in memory 202 until changed. The user may also activate recording from standby mode, shown in FIG. 3 as recording mode 315, and described below in greater detail with respect to FIG. 5.

Figure 4:
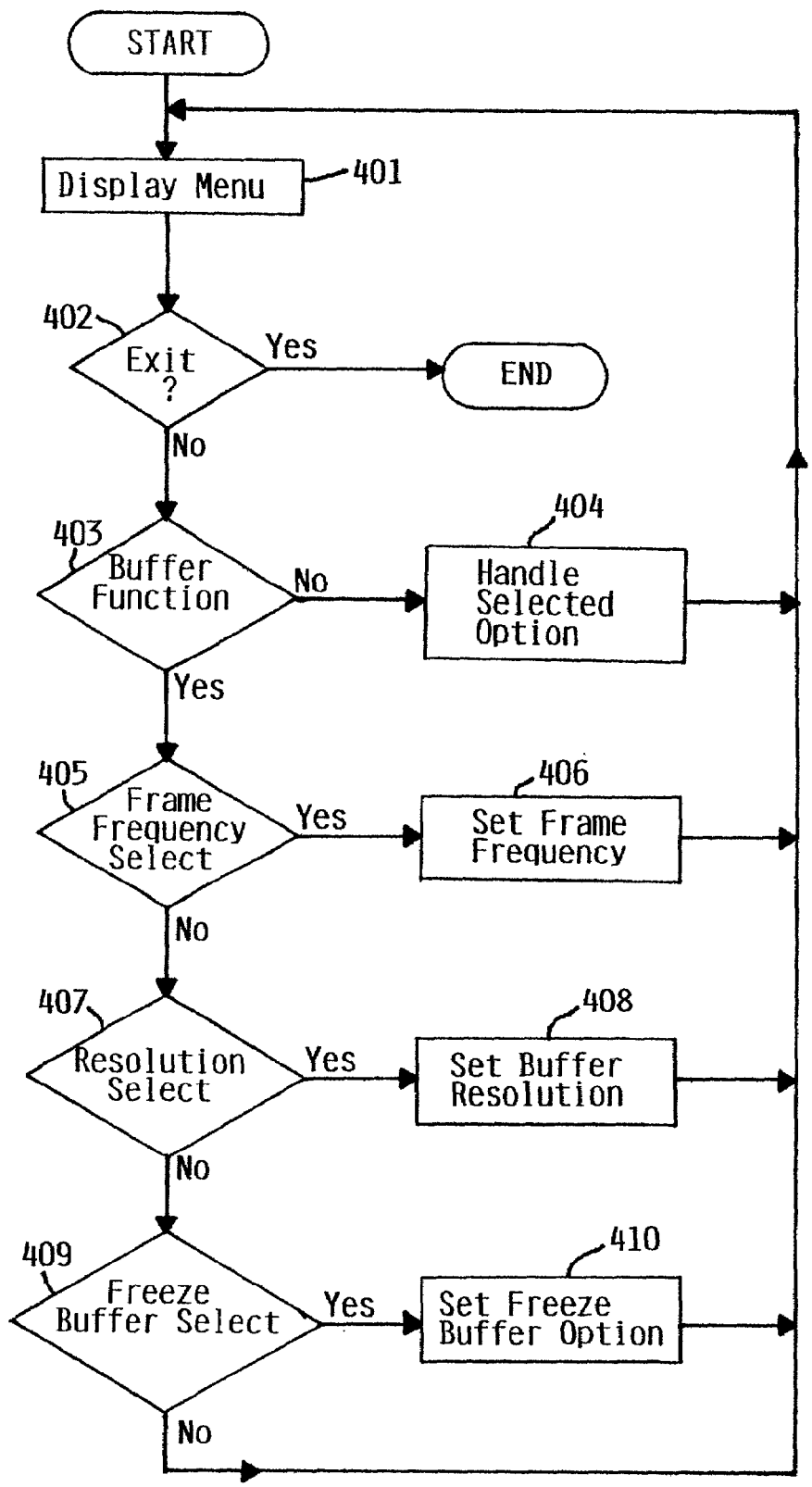
FIG. 4 is a flow diagram illustrating the operation of the camera control program when setting motion video recording parameters, according to the preferred embodiment.

FIG. 4 illustrates the operation of the camera control program when the user has selected the set recording parameter values mode 314. Upon entering mode 314, the control program causes a menu of choices to be displayed on display 105 (step 401). This menu may be arranged in a hierarchical tree structure, or may contain multiple sequential pages, or otherwise have multiple views, depending on the number of available choices and options, so that the entire menu of choices is not necessarily displayed at any one time. One of the options available is to exit the selection menu. It this option is chosen (the "Y" branch from step 402), the set parameters process terminates and the control program returns to motion video standby mode 313. If a function unrelated to buffer 204 is selected (the "N" branch from step 403), the selected option is handled accordingly, represented generally as step 404. Step 404 is intended to represent any of various options and settings, now known are hereafter developed, which may be available, and which are not necessarily related to buffer function. E.g., the user may select tape recording speed, motion video frame resolution, recording format for motion video, low-light options, etc.

If the user selects a buffer-related setting (the "Y" branch from step 403), several options are available according to the preferred embodiment. The user may select the frame frequency of buffer recording, shown as step 406, following the "Y" branch from step 405. The frame frequency is the frequency (1/N) of frames that are temporarily stored in buffer 204. The user may elect to store every frame (i.e., N=1) in buffer 204, but it is obvious in this case that the buffer will fill up very quickly. By selecting a lower frequency, the buffer will not fill so quickly, and thus will hold a longer segment of video recording. This gives the user more time to decide whether to preserve something in the buffer, and greater "second-guessing" ability. In the preferred embodiment, the user may set N=1, 10 or 255. The optimal choice will depend on the subject being recorded and recording conditions. For example, where the user is recording a fast-paced sporting event, it may be necessary to save every frame (N=1) in order to capture the critical instant; in this case, the user must train himself to rapidly preserve the buffer contents, since the buffer will soon be overwritten. Where the action is more slow paced (e.g., children at play), an intermediate setting of N=10, which saves 1 frame approximately every ⅔ sec, should be sufficient to capture any critical moments. A very low frequency setting of N=255 (one frame every 17 seconds) may be used, e.g., where the user is recording a longer, slow paced event, which does not necessarily have any critical moments, and for which the user simply wants some representative frames. For example, a speech may be recorded using the low frequency setting, allowing the user to choose one or more spaced apart frames from the buffer at a later time.

The user may alternatively select the resolution of buffer recording, shown as step 408, following the "Y" branch from step 407. The resolution is the number of pixels or pixel density of the recorded image, a lower resolution obviously requiring less buffer space, and hence not filing the buffer so quickly. In the preferred embodiment, the user may select high resolution, low resolution, or high/low resolution at step 408. High resolution means than all frames are saved at high resolution in buffer 406 (approx. 3 M pixels), and that as the buffer fills up, the oldest frames in the buffer are overwritten. Low resolution operates in the same manner, but all frames are saved at low resolution (half the high resolution rate, or approx 1.5 M pixels), so that number of frames and the time span covered by those frames is correspondingly greater. High/low resolution saves each frame initially at high resolution, and then ages it to low resolution, before it is ultimately aged out of the buffer altogether by being overwritten.

The user may also select the freeze option for buffer recording, shown as step 410, following the "Y" branch from step 409. The freeze option specifies the action when the user elects to freeze buffer contents in order to later review and save one or more frames in the buffer. I.e., when a critical event occurs during recording, the user may select buffer freeze, which freezes at least some buffer contents and prevents these contents from being overwritten, as explained below. The available freeze options are to freeze the entire buffer, to freeze half the buffer, or to freeze a user-selected segment by playing the segment backwards until the user identifies the beginning of the segment. Freezing the full buffer is simplest and provides the maximum saved segment, but it effectively means that one and only one segment can be saved, until that segment is later reviewed and "unfrozen". Freezing half the buffer allows the user to continue recording, and later freeze the other half, but since the half that is frozen is the most recent half, it naturally reduces the time window to act. The third option, freezing a user-selected segment, gives the user greater flexibility to define the segment and therefore potentially improves buffer utilization, but it requires greater intervention and attention on the part of the user while the user may be attempting to continue video recording.

After selecting and executing an appropriate option, the control program returns to step 401, to display the available menu (which may have changed, depending on the user's action). If no option is selected, the "N" branch is taken from step 409, indicating that the control program remains in a loop awaiting a user input.

Figure 5A:
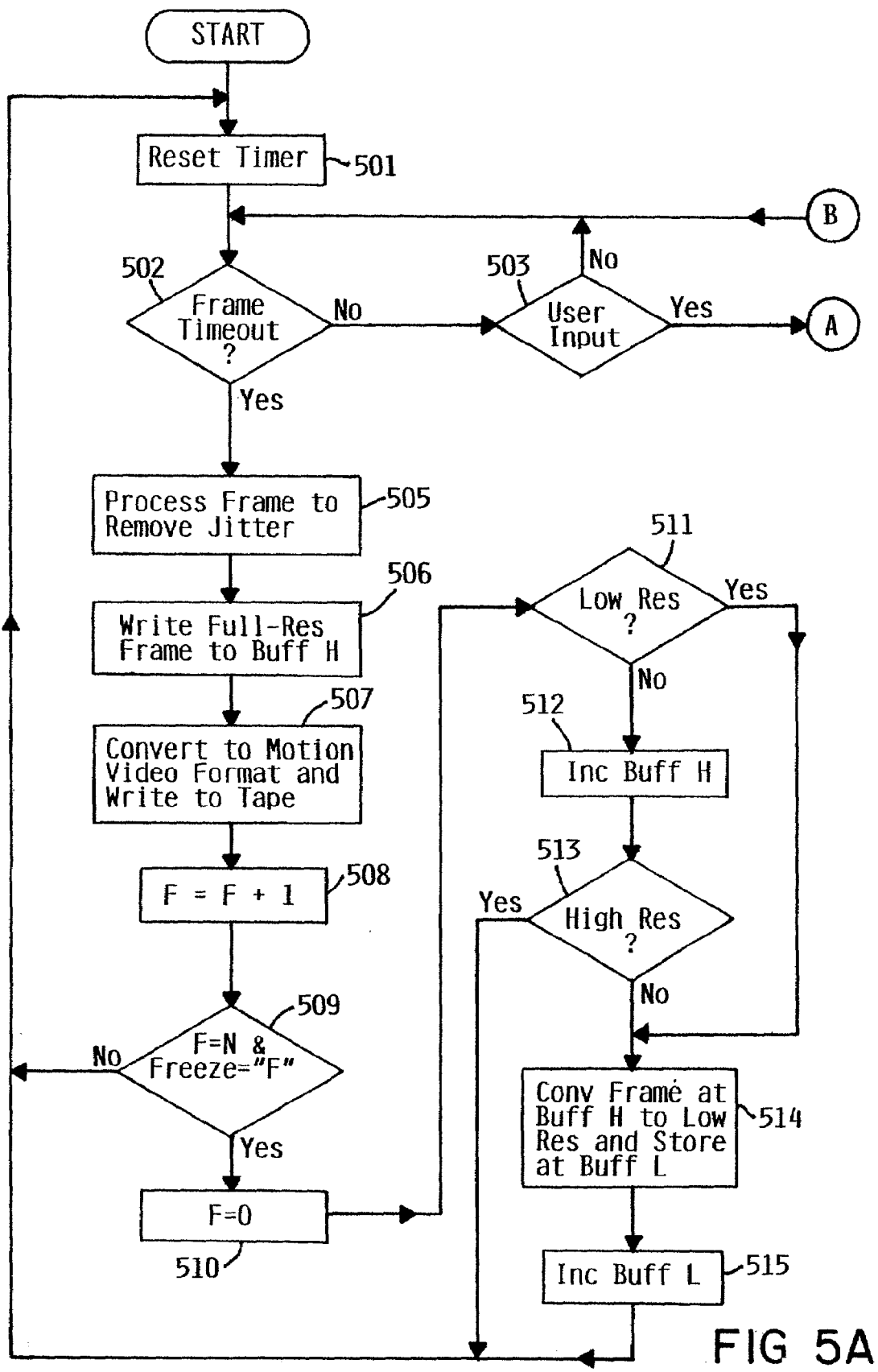
FIGS. 5A and 5B are collectively a flow diagram showing the operation at a high level of the camera control program when recording motion video, according to the preferred embodiment.
Figure 5B:
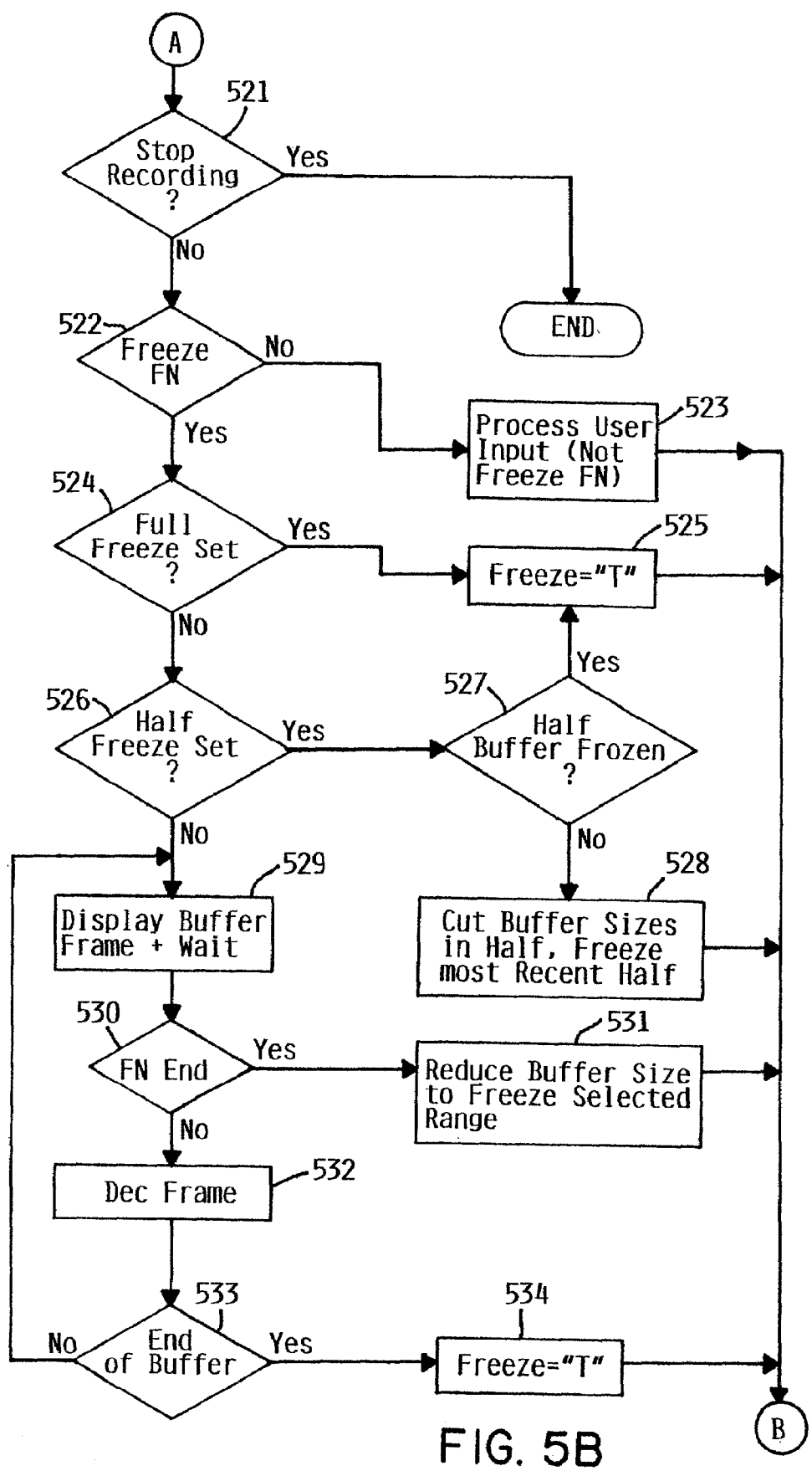

FIGS. 5A and 5B (herein collectively referred to as FIG. 5) are a flow diagram showing the operation at a high level of control program 203 when operating in recording mode 315 to record motion video and simultaneously buffer higher resolution still video frames. As shown in FIG. 5, a frame timer is reset (step 501), and the control program thereafter waits in a loop at steps 502 and 503, for either a frame timeout or a user input. The frame timer times out every ¹⁄₁₅ sec, indicating that the next frame should be captured. If a user input is received while waiting on the frame timer, the "Y" branch is taken from step 503, and the user input is handled according to steps 521–527.

When the frame timer times out, the "Y" branch is taken from step 502. The accumulated charge in the CCD array is then captured and subjected to a jitter reduction process which produces a video frame somewhat smaller than the full CCD array, according to any of various such processes (step 505). Jitter reduction may require the use of a special auxiliary processor. The frame is then written to buffer 204 in full resolution (i.e., approx 3 M pixels in the exemplary embodiment) at address BuffH (step 506). The frame is then converted to motion video format and written to the motion video media 110 (step 507). Specifically, motion video format implies that the frame is converted to a lower pixel resolution. It may additionally be compressed using any appropriate compression algorithm. It may also be stored in an analog form, although in the preferred embodiment, it is stored in digital form at low resolution, i.e., approx. 300K pixels per frame.

The frame counter F is then incremented (step 508), and the frame counter is compared to N, the frequency setting of frames stored in the buffer. If F=N and if the freeze flag is false (indicating the buffer has not been "frozen"), then the "Y" branch is taken from step 509, and the current frame will be temporarily saved in the buffer. If not, the "N" branch is taken and the control program resets the frame timer (step 501) to await the next frame.

In operation, buffer 204 is maintained as either one or two circular buffers, so that there are one or two buffer pointers (called BuffH and BuffL) which point to the current buffer address of high resolution and low resolution frames, respectively. If the user selected high buffer resolution, there is only one circular buffer for high resolution frames, and BuffL is not used. If the user selected low buffer resolution, the high resolution portion of the buffer holds only one frame, and BuffH never changes, the remainder of the buffer being a circular buffer used for low resolution frames. If the user selected high/low resolution, both circular buffer sections contain multiple frames, and both BuffH and BuffL change.

In the case where the "Y" branch is taken from step 509, the frame counter F is reset to 0 (step 510). If the buffer is not operating in low resolution (step 511), the BuffH pointer is incremented by the high resolution frame size to the next frame address (step 512), causing subsequent frames to be stored at this address, and the current frame to be temporarily saved in the buffer until the BuffH address is incremented all the way around the circular buffer. If the buffer is in high resolution, the "Y" branch is taken from step 513, and the process returns to step 501. Otherwise, frame at BuffH is converted to low resolution and written to the low resolution part of the buffer at BuffL (step 514). BuffL is then incremented by the low resolution frame size (step 515), and the process returns to step 501.

When a user input is received while waiting for the frame timer to time out (the "Y branch from step 503), the user input is processed as shown in steps 521–527. The user input may be of several types. If the user input is a direction to stop recording (as be pressing a "record" function button), the "Y" branch is taken from step 521 and recording is immediately halted. In this case, the camera control returns to motion video standby mode 313. It will be noted that in this case the contents of buffer 204 are not flushed, but remain in the buffer until the user again records additional frames to overwrite the contents, or there is a loss of power or similar event.

Where the "N" branch is taken from step 521, other user input is processed. As depicted in the simplified FIG. 5, other user input is classified as either a freeze buffer command or any other user input. If the user in put is not a freeze buffer command, the "N" branch is taken from step 522, and the user input is processed in ap appropriate manner (step 523). Such user input may include any of various conventional functions, such as zoom in/out, manual focus, manual lighting adjustments, and so forth, a further description of which is not essential to an understanding of the present invention.

Among the user inputs is a freeze buffer command, which may be given by any appropriate means, such as pressing a function button on camera housing 101. If the user input is a freeze buffer command, the "Y" branch is taken from step 522. The control program then determines the current buffer freeze setting, which may be set by the user at step 410. If the buffer is set to full freeze, the "Y" branch is taken from step 524, and a freeze flag in memory is set to "true" (step 525). Setting the freeze flag to true prevents the "Y" branch from being taken from step 509, i.e., prevents further overwriting of the buffer except at the single BuffH location, which does not change. If the buffer is set to half freeze, the "Y" branch is taken from step 526. In this case, the control program determines whether half of the buffer has already been frozen (step 527). If so, the "Y" branch is taken from step 527, and the freeze flag is set to "true" (step 525). If no part of the buffer has yet been frozen, the control program reduces the available portion of the buffer for writing by one-half, and makes available for overwriting the oldest half of the buffer, thereby freezing the most recent half (step 528).

If the "N" branch is taken from step 526, then the third buffer option, of freezing a user-selected segment, is set. In this case, the contents of the buffer are played backwards from the point at which the user invoked the freeze function until the user selects a beginning point. The buffer segment between the beginning point and the point at which the user invoked the freeze function is frozen. This process is illustrated as steps 529–534. As shown, the control program displays a buffer frame on the viewfinder and waits (step 529). In the preferred embodiment, the buffer frame is displayed in a "window in a window" format on the viewfinder, i.e., the buffer frame is displayed as a reduced size frame overlayed on the larger frame of the motion video being captured. However, it would alternatively be possible to display the buffer frame exclusively, or to display only the motion video frame, or to use some other form of shared display. The waiting period could be $\frac{1}{15}$ second (the period of motion video capture), so that the buffer is played backwards at the same speed that motion video is captured, or could be some other period. If the user has indicated end of buffer freeze function (e.g., by releasing the freeze button), the "Y" branch is taken from step 530. In this case, the buffer segment which has just be played backward to the user is "frozen", and the available buffer for further recording and overwriting is reduced in size accordingly (step 531). If the user has not indicated end of buffer freeze, the "N" branch is taken from step 530, and a frame pointer or indicator is decremented to the immediately preceding frame in the buffer (step 532). If the end of the available (unfrozen) buffer has been reached, the "Y" branch is then taken from step 533, and the freeze flag is set (step 534) indicating that the entire buffer is now frozen. If the buffer end is not reached, the "N" branch is taken from step 533, and the next (preceding) frame is displayed at step 529.

Although not shown in FIG. 5B for clarity of illustration, if the third buffer option of freezing a user-selected segment is set and steps 529–534 are executed, the camera continues to capture and record motion video while the user is playing the buffer backwards to select the buffer segment to be frozen.

It will be observed that if the user issues a freeze buffer command, the program simply prevents further writing to the buffer by setting a flag. Therefore if the buffer is already frozen, nothing further will occur. The frozen contents of the buffer remain the same as the were when the buffer was first frozen.

After processing user input, the control program returns to the loop at steps 502 and 503 to await a frame timeout or another user input (except, of course, in the case where the user in put is to stop recording).

At some point, the user will want to transfer frames in a frozen buffer to another, more permanent, storage medium, thereby allowing the buffer to be re-used for other frames. The user may also decide not to save any frames from a frozen buffer, and simply to unfreeze the buffer and allow it to be re-used. These are accomplished via the safe buffer frames function mode 312, which is invoked by placing the camera in VTR mode 302, and selecting the save buffer frames function from VTR standby mode 311. Selection may be made by any appropriate function key, key combination, or otherwise.

Figure 6:
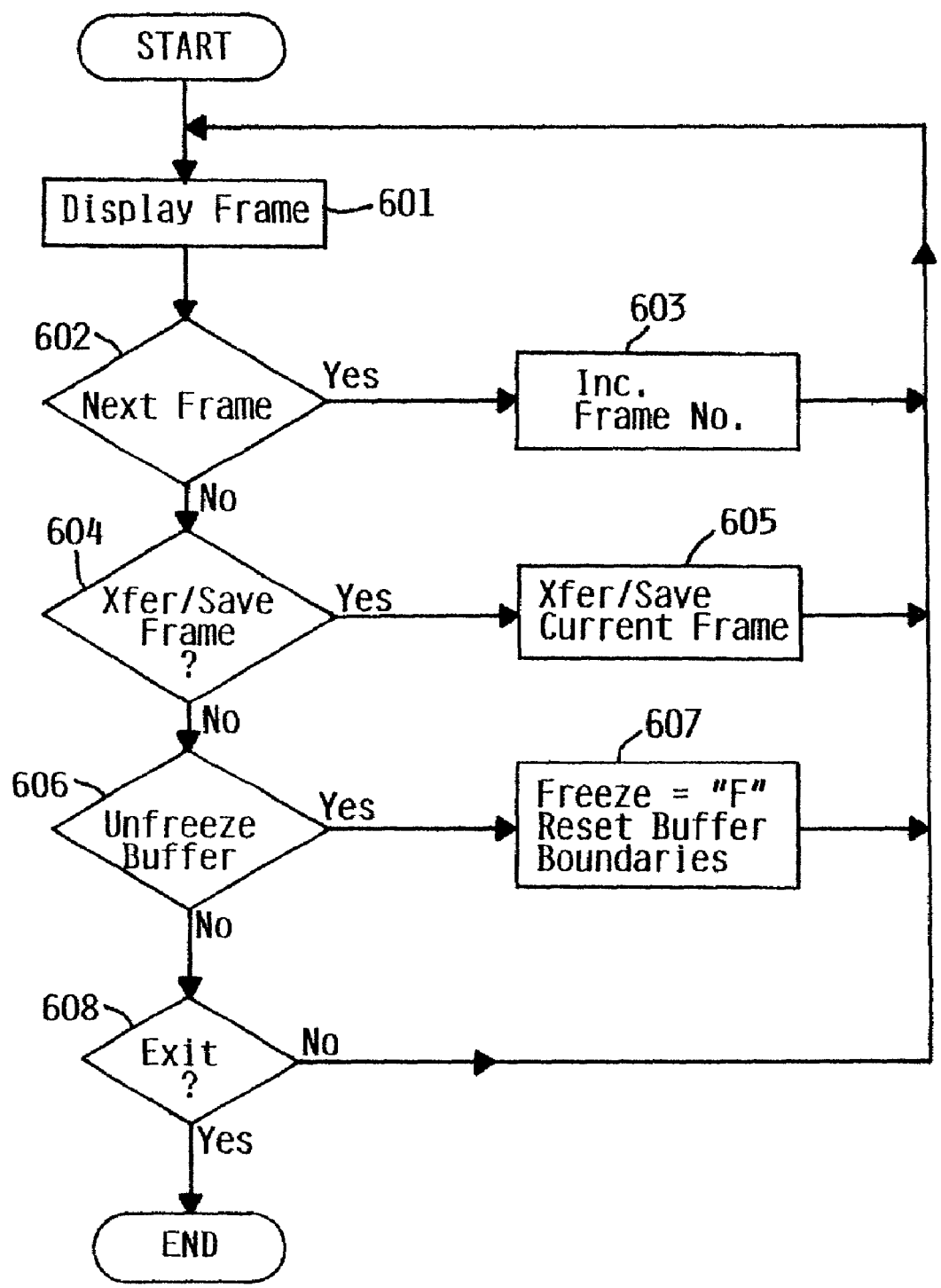
FIG. 6 is a flow diagram showing the operation at a high level of the camera control program saving buffer frames and unfreezing the buffer, according to the preferred embodiment.

FIG. 6 is a flow diagram showing the operation at a high level of control program 203 when operating in save buffer frames mode 312. On entering the save buffer frames mode, the camera displays a frame indicated by a frame pointer from the buffer on viewfinder display 105 (step 601). The camera may optionally simultaneously display the frame on a larger LCD display, or on an external display using video output of the camera.

The user may scroll through the frame contents of the buffer, one frame at a time, by activating an appropriate function button. If the user elects to scroll to the next frame, the "Y" branch is taken from step 602, the frame pointer is incremented to the next frame (step 603), and the control program then returns to step 601 to display the next frame. It will be observed that, in the preferred embodiment wherein buffer 204 may be used both for storing still frames taken in the still photo mode 303, and buffered frames taken while in motion video recording mode 315, the buffer may contain frames from both sources. The user scrolls through all frames, regardless of source, and may select any frame for transfer or saving as described below.

If a frame is displayed which the user wishes to save in some manner (the "Y" branch from step 604), the user activates an appropriate function key to transfer or save the currently displayed frame, and camera transfers/saves the frame according to the elected or default method (step 605). In the preferred embodiment, frames are saved by transferring the frame to an external device. This external device may be a general purpose digital computer having appropriate video software installed, whereby it can save, edit, print, and transfer, video images. Alternatively, the external device could be a special-purpose video storage device, such as a DVD, CD-ROM, or VTR having still frame recording capability. However, it would also be possible to save frames to an on-board storage medium, and saving frames to an on-board storage medium could be offered as one of multiple options to the user, or could be the exclusive method of saving frames. The on-board storage medium could be storage medium 110 used for storing motion video, or could be a separate medium such as a flash semiconductor memory "stick" (not shown).

The user may separately elect to unfreeze the buffer by appropriate function key, indicated as the "Y" branch from step 606. In this case, the control program resets the freeze flag to "false", and resets the buffer boundaries to their initial default values (step 607). I.e., the full buffer is again made available for buffering still images while recording motion video in motion video recording mode 315. The available buffer space is reset to its initial boundaries because (a) some still images may have been taken while in still image mode 303, which automatically reduces the amount of buffer space available for buffering while recording motion video, and/or (b), the buffer may have been operating with the half-freeze option or user-selected segment option set, in which case only part of the buffer may have been used. The buffer is explicitly unfrozen by the user. If the user does not unfreeze the buffer, it remains in the same state as before, which may prevent or restrict further buffering of images. If the buffer is unfrozen as described herein, the images are not immediately erased. The images remain in the buffer until they are overwritten again by normal use of the camera, as described herein.

The user may, while in the save buffer frames mode 312, continue to display frames, to save any arbitrary frames or collections of frames, or to unfreeze the buffer, as described above, by returning to step 601. When the user elects to exit the save buffer frame mode 312, the "Y" branch is taken from step 608 and the save buffer frame function ends.

In the preferred embodiment, frames stored in buffer 204 are stored in uncompressed format, which implies a rather large buffer. At a minimum, it will be expected that each pixel in raw data form will require one byte of storage, and may require more, depending on the pixel scan electronics, whether a pixel is monochromatic or trichromatic, etc. E.g., an uncompressed frame in high resolution can be expected to require 3 Mbytes of storage or more. If the buffer is operating in high resolution mode with N=1 and assuming a minimal storage of 3 Mbytes per image, approximately 225 Mbytes of storage will be needed to store 5 seconds of video, which should be considered a minimum desirable interval for the user to freeze the buffer. It may well be desirable to have a larger buffer to accommodate greater storage per image or a longer interval. Buffer size requirements can be significantly reduced if the frames are compressed in the buffer using any of various compression techniques, but this imposes additional processing burden, particularly if the frames are first stored in high resolution, and then aged to a lower resolution. Such additional processing might be performed with a dedicated special-purpose processor, but since the data is only stored temporarily, the use of a larger memory is deemed the best design alternative.

The various frame pixel sizes, buffer sizes, frame rates, and other quantitative parameters quoted herein are intended by way of example only, and it will be understood that different quantities may be used within the scope of the present invention. In particular, it may be expected that as digital electronic technologies improve and prices decline, it may be desirable to provide for greater resolutions and storage capacities than those mentioned in the examples herein.

It will be appreciated that the above description and drawings are intended to illustrate but a single embodiment, and many alternatives are possible within the scope of the present invention. The frame frequency, resolution and freeze buffer options described herein are merely three examples of optional settings or parameters that may be offered to the user in connection with the use of a frame aging buffer. Other or additional parameters may alternatively be used, and it would not be necessary that the three parameters described herein, or that any parameter options, be offered to the user. Furthermore, the method of freezing the buffer contents described herein may be differently enabled. For example, instead of freezing the buffer for later viewing and selection as described herein, the user may be given the choice of immediately selecting all or a portion of the buffer contents for preservation on some more persistent storage medium. Additional or other modes of operation that those described herein may be offered to the user.

In general, the routines executed to implement the illustrated embodiments of the invention, whether implemented within camera 100 or externally, as part of an operating system or a specific application, program, object, module or sequence of instructions are referred to herein as "programs" or "control programs". The programs typically comprise instructions which, when read and executed by one or more processors in the devices or systems consistent with the invention, cause those devices or systems to perform the steps necessary to execute steps or generate elements embodying the various aspects of the present invention. Moreover, while the invention has and hereinafter will be described in the context of fully functioning camera apparatus or other systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 2 as memory 202.

In the preferred embodiment described above, still frames are buffered while simultaneously recording motion video. However, it would additionally or alternatively be possible to support a different mode of operation, which is similar to the above described motion video mode with still image buffering, except that motion video frames are not recorded on media 110. I.e., the optical sensor, focusing, viewfinder and so forth operate exactly as if motion video is being recorded, but no motion video is recorded to media 110, and instead frames are only stored in buffer 204. This could be accomplished, e.g., by recording frames in buffer 204 while the camera is in motion video standby mode 313. Such a mode of operation might be useful, e.g., where the user wishes only to capture a still image (i.e., is not interested in motion video), but can not pose the subjects and does not know in advance when the best still image will occur.

In the preferred embodiment described herein, the electronic camera apparatus is a self-contained, portable camera, having a battery for providing power. However, it will be appreciated that a camera apparatus in accordance with the present invention could alternatively comprise multiple components which are physically separated from one another, some or all of which may be stationary. For example, in accordance with the present invention, the camera apparatus may be a security surveillance system comprising one or more cameras coupled to a central controller and recording device or devices, the buffer typically being contained in the central controller and subject to control of a security officer.

Although a specific embodiment of the invention has been disclosed along with certain alternatives, it will be recognized by those skilled in the art that additional variations in form and detail may be made within the scope of the following claims.

What is claimed is:

1. An electronic camera apparatus, comprising:
an electronic optical sensing apparatus, said electronic optical sensing apparatus sensing optical images and converting sensed images to an electronic signal;
a buffer memory;
a video storage medium interface for storing video images captured by said optical sensing apparatus on a storage medium; and
a controller which operates said electronic camera apparatus in at least one mode, said at least one mode including a first mode wherein said controller concurrently: (a) causes said video storage medium interface to store motion video captured by said optical sensing apparatus on a video storage medium at a first resolution, and (b) temporarily stores video frames captured by said optical sensing apparatus in said buffer memory;
wherein said controller, responsive to a first user command, saves at least one frame being temporarily stored in said buffer memory in a persistent form at a second resolution, said second resolution being finer than said first resolution, said first user command being received after said electronic optical sensing apparatus captures said at least one frame being saved; and
wherein said controller automatically deletes each respective said video frame captured by said optical sensing apparatus from said buffer memory without saving the respective said video frame in a persistent form at said second resolution if a said first user command for saving the respective said video frame is not received before a pre-determined event occurs;
wherein said controller, responsive to said first user command, saves a user-selectable portion of the contents of said buffer memory in a persistent form at said second resolution, said user-selectable portion being potentially less than all of the buffer contents; and
wherein said user-selectable portion of the contents of said buffer is determined by playing the contents of said buffer back to the user on a display of said camera, and receiving a user selection corresponding to a beginning frame to be saved in said persistent form.

2. The electronic camera apparatus of claim 1, wherein said electronic optical sensing apparatus, said buffer memory, said video storage medium and said controller are mounted within a common hand-held camera housing.

3. The electronic camera apparatus of claim 1, wherein said controller operating in said first mode stores every Nth video frame captured by said optical sensing apparatus in said buffer during a respective temporary period, N being a user-selectable parameter, wherein at least one user-selectable value of N is greater than 1.

4. The electronic camera apparatus of claim 1, wherein said buffer is organized as at least one circular buffer in which the oldest stored frame is overwritten with a new frame when the new frame is captured.

5. A method for operating an electronic camera apparatus, comprising the steps of:
capturing a sequence of optical images with an electronic optical sensing apparatus;
storing motion video images from said sequence of optical images on a motion video storage medium at a first resolution;
temporarily storing image data from said sequence of optical images in a buffer, said step of temporarily storing image data being performed concurrently with said step of storing motion video images, said image data in said buffer being continuously overwritten by new image data from said sequence of optical images;

making a decision to save at least one recently captured image, said decision being made by a human user after the at least one recently captured image is captured by said electronic optical sensing apparatus; and responsive to a command issued by said human user, said command being responsive to making said decision to save at least one recently captured image, said command being issued before said at least one recently captured image is overwritten in said buffer, saving at least some images being temporarily stored in said buffer including said at least one recently captured image in a persistent form at a second resolution, said second resolution being finer than said first resolution.

6. The method for operating an electronic camera apparatus of claim 5, wherein each video frame captured by said optical sensing apparatus is stored in said buffer during a respective temporary period.

7. The method for operating an electronic camera apparatus of claim 5, wherein every Nth video frame captured by said optical sensing apparatus is stored in said buffer during a respective temporary period, where N>1.

8. The method for operating an electronic camera apparatus of claim 7, wherein N is a user-selectable parameter.

9. The method for operating an electronic camera apparatus of claim 5, wherein said buffer is organized as at least one circular buffer in which the oldest stored frame is overwritten with a new frame when the new frame is captured.

10. The method for operating an electronic camera apparatus of claim 9, wherein said buffer is organized as a plurality of circular buffers, each circular buffer storing frames at a respective resolution, a first circular buffer storing frames at a higher resolution than a second circular buffer.

11. The method for operating an electronic camera apparatus of claim 5, wherein a resolution of frames stored in said buffer is a user-selectable parameter.

12. The method for operating an electronic camera apparatus of claim 5, wherein said step of saving at least some images from said buffer in a persistent form comprises saving the entire contents of said buffer memory in a persistent form at said second resolution.

13. The method for operating an electronic camera apparatus of claim 5, wherein said step of saving at least some images being temporarily stored in said buffer in a persistent form comprises saving a fixed portion of the contents of said buffer memory in a persistent form at said second resolution, said fixed portion being less than all of the buffer contents.

14. The method for operating an electronic camera apparatus of claim 5, wherein said step of saving at least some images being temporarily stored in said buffer in a persistent form comprises saving a user-selectable portion of the contents of said buffer memory in a persistent form at said second resolution, said user-selectable portion being potentially less than all of the buffer contents.

15. The method for operating an electronic camera apparatus of claim 5, wherein the step of saving said at least one recently captured image comprises:

responsive to a first command issued by said human user, freezing at least a portion of said buffer containing said at least some of said optical images; and p responsive to a second command issued by said human user, displaying images of said at least some of said optical images frozen in said buffer and receiving a user selection of at least one individual image of said frozen optical images for saving in a storage medium separate from said buffer.

16. A method for operating an electronic camera apparatus, comprising the steps of:

capturing a continuous stream of optical images with an electronic optical sensing apparatus;

temporarily storing image data from said continuous stream of optical images in a circular buffer, said circular buffer being continuously overwritten by new image data from said continuous stream of optical images;

making a decision to save at least one recently captured image, said decision being made by a human user after the at least one recently captured image is captured by said electronic optical sensing apparatus;

responsive to a command issued by said human user, said command being responsive to making said decision to save at least one recently captured image, said command being issued before said at least one recently captured image is overwritten in said circular buffer, saving at least some image data from said buffer including said at least one recently captured image in a persistent form, wherein said step of saving at least some image data from said buffer in a persistent form saves at least some frames at a first resolution;

automatically deleting each respective said optical image from said circular buffer without saving the respective said optical image in a persistent form if a said command issued by said human user for saving the respective said optical image is not received before the image is overwritten with subsequently captured image data; and storing motion video from said continuous stream of optical images on a motion video storage medium at a second resolution, said first resolution being finer than said second resolution, said storing motion video step being performed concurrently with said temporarily storing image data step.

17. The method for operating an electronic camera apparatus of claim 16, wherein every Nth video frame captured by said optical sensing apparatus is stored in said circular buffer during a respective temporary period, N being a user-selectable parameter, wherein at least one user-selectable value of N is greater than 1.

18. A program product for controlling the operation of an electronic camera apparatus, said electronic camera apparatus having an electronic optical sensing apparatus for sensing optical images and converting sensed images to an electronic signal, said program product comprising a plurality of processor executable instructions recorded on signal-bearing media, wherein said instructions, when executed by at least one programmable processor of said electronic camera apparatus, cause the apparatus to perform the steps of:

capturing a sequence of optical images with said electronic optical sensing apparatus;

storing motion video images from said sequence of optical images on a motion video storage medium at a first resolution;

temporarily storing image data from said sequence of optical images in a buffer, said step of temporarily storing image data being performed concurrently with said step of storing motion video images, said image data in said buffer being continuously overwritten by new image data from said sequence of optical images; and responsive to a user command, saving at least some images being temporarily stored in said buffer in a persistent form at a second resolution, said second resolution being finer than said first resolution, said user command being received before said at least some images being saved are overwritten in said buffer, said user command being responsive to a decision made by a human user, said decision being made after said electronic optical sensing apparatus captures said at least some images being saved.

19. The program product of claim 18, wherein each video frame captured by said optical sensing apparatus is stored in said buffer during a respective temporary period.

20. The program product of claim 18, wherein every Nth video frame captured by said optical sensing apparatus is stored in said buffer during a respective temporary period, where N>1.

21. The program product of claim 18, wherein said buffer is organized as at least one circular buffer in which the oldest stored frame is overwritten with a new frame when the new frame is captured.

22. The program product of claim 18, wherein said step of saving at least some images being temporarily stored in said buffer in a persistent form comprises saving the entire contents of said buffer memory in a persistent form at said second resolution.

23. The program product of claim 18, wherein said step of saving at least some images being temporarily stored in said buffer in a persistent form comprises saving a user-selectable portion of the contents of said buffer memory in a persistent form at said second resolution, said user-selectable portion being potentially less than all of the buffer contents.

24. The program product of claim 18, wherein the step of saving at least some images being temporarily stored in said buffer comprises:
  responsive to a first command issued by said human user, freezing at least a portion of said buffer containing said at least some images; and
  responsive to a second command issued by said human user, displaying images of said at least some images frozen in said buffer and receiving a user selection of at least one individual image of said at least some images frozen in said buffer for saving in a storage medium separate from said buffer.

25. An electronic camera apparatus, comprising:
  an electronic optical sensing apparatus, said electronic optical sensing apparatus sensing optical images and converting sensed images to an electronic signal;
  a buffer memory;
  a video storage medium interface for storing video images captured by said optical sensing apparatus on a storage medium; and
  a controller which operates said electronic camera apparatus in at least one mode, said at least one mode including a first mode wherein said controller concurrently: (a) causes said video storage medium interface to store motion video captured by said optical sensing apparatus on a video storage medium at a first resolution, and (b) temporarily stores sequential images captured by said optical sensing apparatus in said buffer memory, said controller continuously overwriting images temporarily stored in said buffer with subsequently captured images while operating in said first mode;
  wherein said controller, responsive to a user command, saves at least one recently captured image being temporarily stored in said buffer memory in a persistent form at a second resolution, said second resolution being finer than said first resolution, said user command being received before said at least one recently captured image is overwritten in said buffer, said user command being responsive to a decision made by a human user, said decision being made after said electronic optical sensing apparatus captures said at least one recently captured image being saved.

26. The electronic camera apparatus of claim 25, wherein said electronic optical sensing apparatus, said buffer memory, said video storage medium and said controller are mounted within a common hand-held camera housing.

27. The electronic camera apparatus of claim 25,
  wherein said controller, responsive to a first user command, freezes at least a portion of said buffer containing said plurality of sequential images; and
  wherein said controller, responsive to a second user command, displays images of said plurality of sequential images frozen in said buffer and receives a user selection of at least one individual image of said plurality of sequential images for saving in a storage medium separate from said buffer.

28. The electronic camera apparatus of claim 25, wherein said controller operating in said first mode stores each video frame captured by said optical sensing apparatus in said buffer during a respective temporary period.

29. The electronic camera apparatus of claim 25, wherein said controller operating in said first mode stores every Nth video frame captured by said optical sensing apparatus in said buffer during a respective temporary period, N being a user-selectable parameter, wherein at least one user-selectable value of N is greater than 1.

30. The electronic camera apparatus of claim 25, wherein said buffer is organized as at least one circular buffer in which the oldest stored image is overwritten with a new image when the new image is captured.

31. The electronic camera apparatus of claim 30, wherein said buffer is organized as a plurality of circular buffers, each circular buffer storing images at a respective resolution, a first circular buffer storing images at a higher resolution than a second circular buffer.

32. The electronic camera apparatus of claim 25, wherein said controller, responsive to said user command, saves a fixed portion of the contents of said buffer memory in a persistent form at said second resolution.

33. The electronic camera apparatus of claim 25, wherein said controller, responsive to said user command, saves a user-selectable portion of the contents of said buffer memory in a persistent form at said second resolution, said user-selectable portion being potentially less than all of the buffer contents.

* * * * *